United States Patent
Shigetomi

(10) Patent No.: US 9,467,589 B2
(45) Date of Patent: Oct. 11, 2016

(54) DISPLAY INPUT APPARATUS AND COMPUTER-READABLE NON-TRANSITORY RECORDING MEDIUM WITH DISPLAY INPUT CONTROL PROGRAM RECORDED THEREON

(71) Applicant: KYOCERA Document Solutions Inc., Osaka (JP)

(72) Inventor: Masayuki Shigetomi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/882,914

(22) Filed: Oct. 14, 2015

(65) Prior Publication Data

US 2016/0119498 A1 Apr. 28, 2016

(30) Foreign Application Priority Data

Oct. 27, 2014 (JP) .................................. 2014-218279

(51) Int. Cl.
| | |
|---|---|
| *H04N 1/00* | (2006.01) |
| *G06F 3/0488* | (2013.01) |
| *G06F 3/12* | (2006.01) |
| *G06F 3/0482* | (2013.01) |
| *G06F 3/0484* | (2013.01) |

(52) U.S. Cl.
CPC ........ *H04N 1/00973* (2013.01); *G06F 3/0482* (2013.01); *G06F 3/0488* (2013.01); *G06F 3/04847* (2013.01); *G06F 3/04883* (2013.01); *G06F 3/1203* (2013.01); *H04N 1/00307* (2013.01); *H04N 1/00392* (2013.01); *H04N 1/00493* (2013.01); *H04N 2201/0094* (2013.01)

(58) Field of Classification Search
None
See application file for complete search history.

(56) References Cited

U.S. PATENT DOCUMENTS

2013/0208312 A1* 8/2013 Morita ................ G06F 3/04883
358/1.15
2014/0320926 A1* 10/2014 Sato ................... H04N 1/00411
358/1.15

FOREIGN PATENT DOCUMENTS

| | | |
|---|---|---|
| JP | 2007-279793 A | 10/2007 |
| JP | 2013-123811 A | 6/2013 |
| WO | 2013-088651 A1 | 6/2013 |

OTHER PUBLICATIONS

Extended European Search Report dated Mar. 21, 2016 mailed in the corresponding European Patent Application No. 15190849.8.

* cited by examiner

*Primary Examiner* — Andrew H Lam
(74) *Attorney, Agent, or Firm* — IP Business Solutions, LLC

(57) ABSTRACT

A display input apparatus includes a display section, a touch panel, a gesture acceptance section, a display control section, a job generating section, a communication section, and a communication control section. The job generating section is configured to, when a slide gesture in a predetermined first direction is made on a candidate image, generate an image formation job based on a piece of data represented by the candidate image. The display control section is configured to, when the slide gesture in the first direction is made on the candidate image, allow the display section to display a pending image indicating a piece of data pending on an image forming apparatus and thereafter, when the communication section receives a report indicating a completion of the image formation job, allow the display section to eliminate the display of the pending image.

11 Claims, 17 Drawing Sheets

US 9,467,589 B2

DISPLAY INPUT APPARATUS AND COMPUTER-READABLE NON-TRANSITORY RECORDING MEDIUM WITH DISPLAY INPUT CONTROL PROGRAM RECORDED THEREON

INCORPORATION BY REFERENCE

This application claims priority to Japanese Patent Application No. 2014-218279 filed on Oct. 27, 2014, the entire disclosure of which are incorporated herein by reference.

BACKGROUND

The present disclosure relates to display input apparatuses and display input control programs and particularly relates to a display input technique in accepting an image formation job based on a user's gesture on a touch panel.

In recent years, techniques have emerged for accepting, based on a user's gesture on a touch panel, an image formation job to be executed by an image forming apparatus. For example, a technique is known for, upon acceptance of a slide gesture, such as a flick gesture or a swipe gesture, in a predetermined direction on an icon representing a candidate piece of data for image formation, accepting an image formation job to allow an image forming apparatus to form an image of the piece of data represented by the icon. This technique enables entry of an image formation job by an intuitive and simple user's gesture.

SUMMARY

A technique improved over the aforementioned technique is proposed as one aspect of the present disclosure.

A display input apparatus according to an aspect of the present disclosure includes a display section, a touch panel, a gesture acceptance section, a display control section, a job generating section, a communication section, and a communication control section.

The display section is configured to display a plurality of candidate images representing candidate pieces of data for image formation.

The touch panel is disposed in front of the display section.

The gesture acceptance section is configured to accept a user's gesture on the touch panel.

The display control section is configured to control a display operation of the display section according to the user's gesture accepted by the gesture acceptance section.

The job generating section is configured to generate an image formation job for an image forming apparatus according to the user's gesture accepted by the gesture acceptance section.

The communication section is configured to be capable of data transfer to and from the image forming apparatus.

The communication control section is configured to control a communication operation of the communication section.

The job generating section is further configured to, when the gesture acceptance section accepts a slide gesture in a predetermined first direction on one of the plurality of candidate images, generate the image formation job to allow the image forming apparatus to perform image formation based on the candidate piece of data for image formation represented by the one candidate image.

The communication control section is further configured to allow the communication section to send the image formation job generated by the job generating section to the image forming apparatus.

The display control section is further configured to, when the gesture acceptance section accepts the slide gesture in the first direction on the one candidate image, allow the display section to display, at an end of a display area of the display section in the first direction, the one candidate image as a pending image indicating a piece of data pending on the image forming apparatus and thereafter, when the communication section receives a report indicating a completion of the image formation job from the image forming apparatus, allow the display section to eliminate the display of the pending image.

A computer-readable non-transitory recording medium according to another aspect of the present disclosure contains a display input control program recorded thereon.

The display input control program allows a computer to function as a gesture acceptance section, a display control section, a job generating section, and a communication control section.

The gesture acceptance section is configured to accept a user's gesture on a touch panel disposed in front of a display section configured to display a plurality of candidate images representing candidate pieces of data for image formation.

The display control section is configured to control a display operation of the display section according to the user's gesture accepted by the gesture acceptance section.

The job generating section is configured to generate an image formation job for an image forming apparatus according to the user's gesture accepted by the gesture acceptance section.

The communication control section is configured to control a communication operation of a communication section capable of data transfer to and from the image forming apparatus.

The display input control program further allows the computer to function so that when the gesture acceptance section accepts a slide gesture in a predetermined first direction on one of the plurality of candidate images, the job generating section generates the image formation job to allow the image forming apparatus to perform image formation based on the candidate piece of data for image formation represented by the one candidate image.

The display input control program further allows the computer to function so that the communication control section allows the communication section to send the image formation job generated by the job generating section to the image forming apparatus.

The display input control program further allows the computer to function so that when the gesture acceptance section accepts the slide gesture in the first direction on the one candidate image, the display control section allows the display section to display, at an end of a display area of the display section in the first direction, the one candidate image as a pending image indicating a piece of data pending on the image forming apparatus and thereafter, when the communication section receives a report indicating a completion of the image formation job from the image forming apparatus, the display control section allows the display section to eliminate the pending image displayed at the end.

DETAILED DESCRIPTION

Hereinafter, a description will be given of a display input apparatus and a display input control program, both according to one embodiment of the present disclosure, with reference to the drawings.

Figure 1:
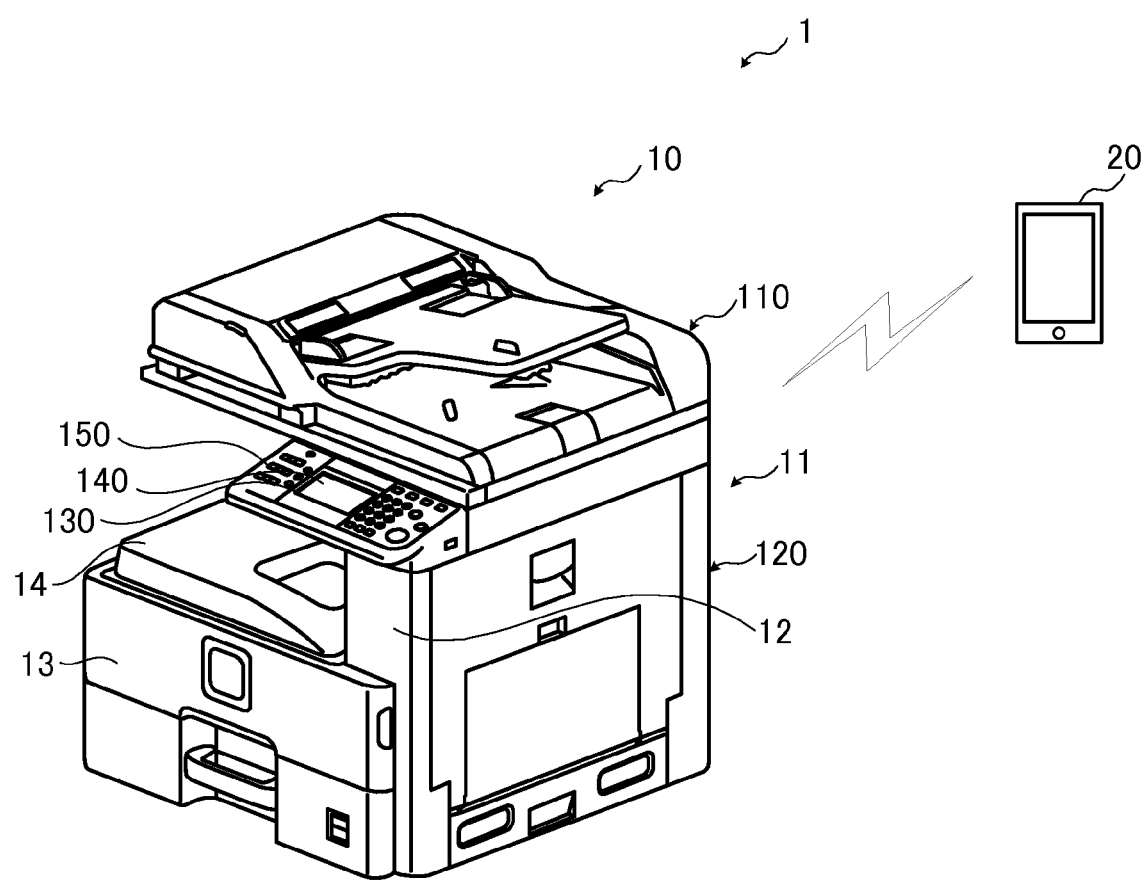
FIG. 1 is a perspective view showing the structure of a display input system according to one embodiment of the present disclosure.
Figure 2:
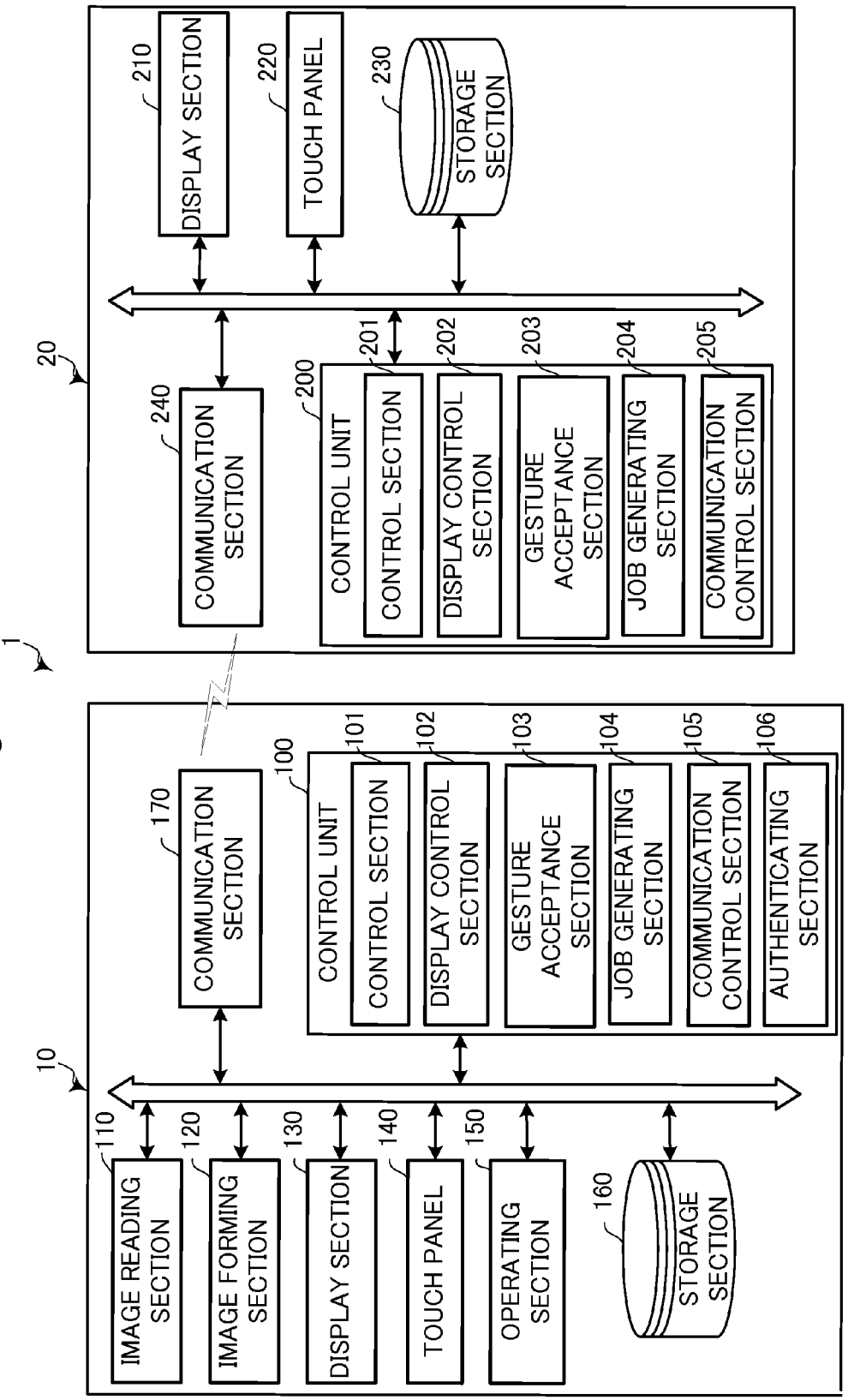
FIG. 2 is a block diagram showing the internal configuration of the display input system according to the one embodiment of the present disclosure.

FIG. 1 is a perspective view showing the structure of a display input system according to one embodiment of the present disclosure. FIG. 2 is a block diagram showing the internal configuration of the display input system according to the one embodiment of the present disclosure.

A display input system 1 includes an image forming apparatus 10 and a mobile terminal device 20 capable of communicating with the image forming apparatus 10. The mobile terminal device 20 serves as a display input apparatus which generates an image formation job based on a user's gesture on a touch panel 220 and sends the generated image formation job to the image forming apparatus 10. First, a description will be given of the structure and configuration of the image forming apparatus 10.

The image forming apparatus 10 is a multifunction peripheral having multiple functions including, for example, a copy function, a print function, a scan function, and a facsimile function. The image forming apparatus 10 is roughly composed of an apparatus body 11, an image reading section 110 disposed above the apparatus body 11, and a connecting portion 12 provided between the image reading section 110 and the apparatus body 11.

The apparatus body 11 is made up to include an image forming section 120, a sheet feed section 13, and so on.

In an image forming operation of the image forming apparatus 10, the image forming section 120 forms a toner image on a recording paper sheet fed from the sheet feed section 13 based on an image read by the image reading section 110 or other images. Thereafter, the toner image formed on the recording paper sheet is heat fixed by an unshown fixing section. The recording paper sheet having an image fixed thereon by the completion of the fixing is discharged to a sheet output tray 14.

A display section 130 and an operating section 150 are disposed at the front of a housing forming a shell of the image forming apparatus 10. The display section 130 is formed to include a liquid crystal display (LCD) or an organic light-emitting diode (OLED) display. The display section 130 is configured to, under the control of a display control section 102 to be described hereinafter, display a setting screen for accepting an image formation job and settings relating to image formation or other screens.

A touch panel 140 is disposed in front of the display section 130. The touch panel 140 is a touch panel of, for example, a so-called resistive film system or a capacitance system and is configured to detect a user's touch of the touch panel 140 together with the point of touch. When detecting the user's touch, the touch panel 140 outputs a detection signal indicating a coordinate point of the point of touch to a hereinafter described gesture acceptance section 103 and so on.

The operating section 150 is hard keys including, for example, a menu key for calling up a menu, arrow keys for moving the focus of a GUI (graphical user interface) forming the menu, a determination key for performing a determination operation for the GUI forming the menu, and so on.

A storage section 160 is a large storage device, such as an HDD (hard disk drive).

A communication section 170 is a network interface composed of a communication module, such as a wireless LAN board.

The image forming apparatus 10 further includes a control unit 100. The control unit 100 is composed of a CPU (central processing unit), a RAM (random access memory), a ROM (read only memory), and so on. When a control program stored in the above ROM or the storage section 160 is executed by the above CPU, the control unit 100 functions as a control section 101, a display control section 102, a gesture acceptance section 103, a job generating section 104, a communication control section 105, and an authenticating section 106. Alternatively, each of the control section 101, the display control section 102, the gesture acceptance section 103, the job generating section 104, the communication control section 105, and the authenticating section 106 of the control unit 100 may not be implemented by the operation of the control unit 100 in accordance with the control program but may be constituted by a hardware circuit.

The control section 101 governs the overall operation control of the image forming apparatus 10. The control section 101 is connected to the image reading section 110, the image forming section 120, the display section 130, the touch panel 140, the operating section 150, the storage section 160, the communication section 170, and so on. The control section 101 performs the operation control of the above components connected thereto and signal or data transfer to and from the components. Particularly, the control section 101 is configured to execute an image formation job generated by the job generating section 104 or an image formation job sent from the mobile terminal device 20 to allow the image forming section 120 or the like to form an image of image data indicated by the image formation job on a recording paper sheet.

The display control section 102 has the function of controlling the display operation of the display section 130.

The gesture acceptance section 103 has the function of accepting, based on a detection signal output from the touch panel 140, a user's gesture on the touch panel 140. Furthermore, the gesture acceptance section 103 also has the function of accepting a user's gesture using the operating section 150, such as a hardware key.

The job generating section 104 has the function of generating an image formation job for the image forming apparatus 10 according to the user's gesture accepted by the gesture acceptance section 103.

The setting screen displayed on the display section 130 presents a plurality of setting items for accepting detailed settings relating to image formation, including, for example, the size of recording paper sheet, image quality, page aggregation, and the destination for sheet output. The job generating section 104 can generate, according to a user's gesture on the setting screen, an image formation job in which detailed settings relating to image formation, such as the size of recording paper sheet, image quality, page aggregation, and the destination for sheet output, are made.

The communication control section 105 has the function of controlling the communication section 170 to allow the communication section 170 to transfer data to and from the mobile terminal device 20 and so on.

The authenticating section 106 has the function of determining whether or not the control section 101 executes the image formation job sent from the mobile terminal device 20 by authenticating or not authenticating the mobile terminal device 20 based on an authentication request sent from the mobile terminal device 20. Thus, it is possible to exclude any image formation job sent from other than one or more particular mobile terminal devices.

Next, a description will be given of the structure and configuration of the mobile terminal device 20. The mobile terminal device 20 is a mobile device such as a smartphone and includes a control unit 200, a display section 210, a touch panel 220, a storage section 230, a communication section 240, and so on.

The display section 210 is formed of a liquid crystal display, an organic light-emitting diode display or the like. The display section 210 is configured to, under the control of a display control section 202 to be described hereinafter, display a document folder screen or other screens.

Figure 3:
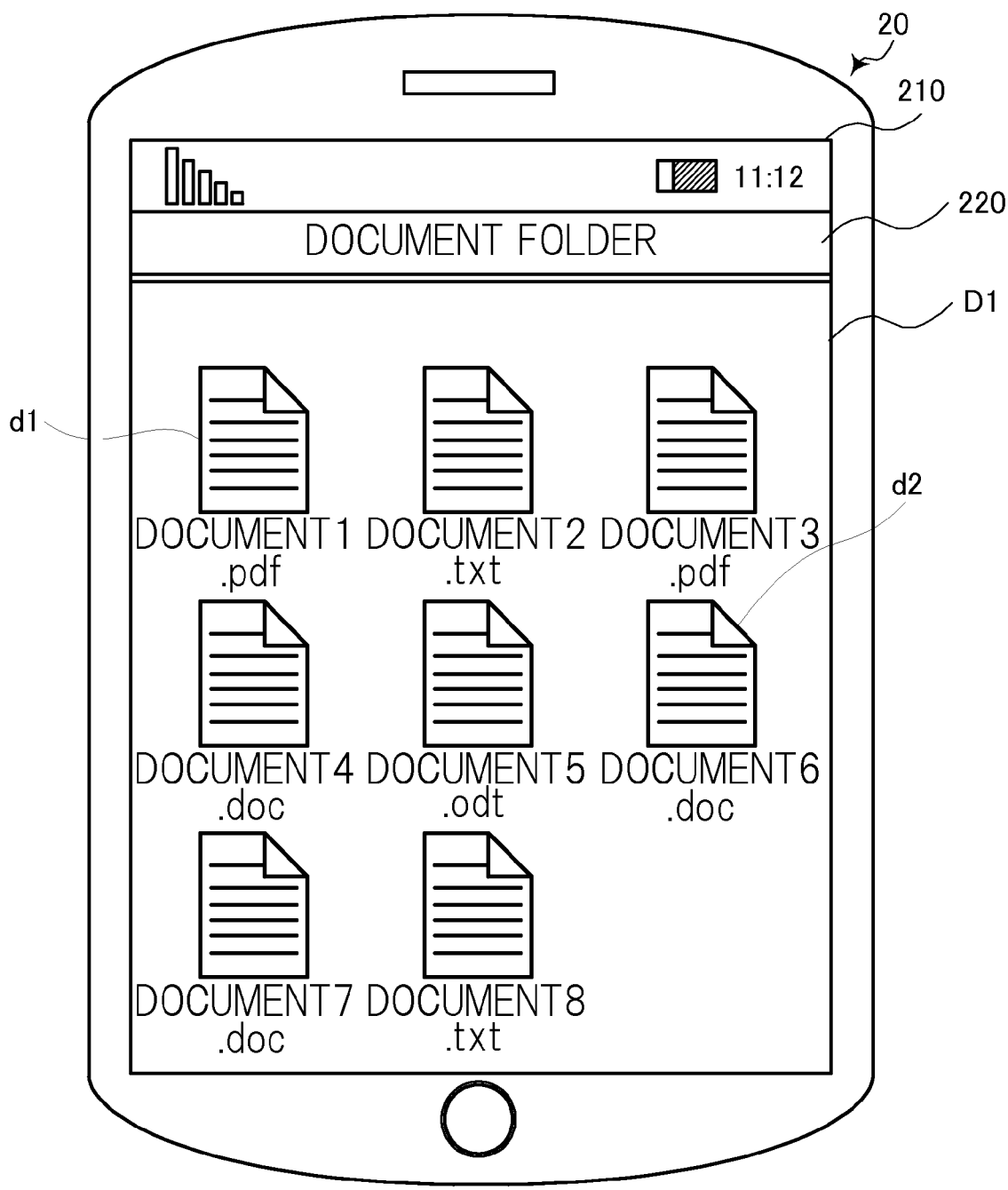
FIG. 3 is a view showing an example of a document folder screen displayed on a display section of a mobile terminal device according to the one embodiment of the present disclosure.

FIG. 3 is a view showing an example of a document folder screen displayed on the display section 210. A plurality of icons d1, d2 (candidate images) and so on are arranged on the document folder screen D1 shown in FIG. 3. The icons d1, d2 represent files, such as document files, serving as candidate pieces of data for image formation on the image forming apparatus 10. A job generating section 204 to be described hereinafter is configured to generate an image formation job for the image forming apparatus 10 according to a touch gesture on any of the icons d1, d2.

The touch panel 220 is disposed in front of the display section 210 and configured to, when detecting a user's touch thereon, output a detection signal indicating a coordinate point of the point of touch to a hereinafter described gesture acceptance section 203 and so on.

The storage section 230 is a large storage device, such as an HDD.

The communication section 240 is a network interface composed of a communication module, such as a wireless LAN chip.

The control unit 200 is composed of a CPU, a RAM, a ROM, and so on. When a display input control program stored in the above ROM or the storage section 230 is executed by the above CPU, the control unit 200 functions as a control section 201, a display control section 202, a gesture acceptance section 203, a job generating section 204, and a communication control section 205. Alternatively, each of the control section 201, the display control section 202, the gesture acceptance section 203, the job generating section 204, and the communication control section 205 of the control unit 200 may not be implemented by the operation of the control unit 200 in accordance with the display input control program but may be constituted by a hardware circuit.

The control section 201 governs the overall operation control of the mobile terminal device 20. The control section 201 is connected to the display section 210, the touch panel 220, the storage section 230, the communication section 240, and so on. The control section 201 performs the operation control of the above components connected thereto and signal or data transfer to and from the components.

The display control section 202 has the function of controlling the display operation of the display section 210.

The gesture acceptance section 203 has the function of accepting, based on a detection signal output from the touch panel 220, a user's gesture on the touch panel 220.

The term user's gesture herein includes: a slide gesture, such as a flick gesture and a swipe gesture; a tap gesture; and a pinch gesture. For example, when the user slides his/her finger on the touch panel 220 while keeping it in touch with the touch panel 220, the touch panel 220 outputs to the gesture acceptance section 203 detection signals indicating a series of points of movement from an initial point at which the touch has been first detected to a last point at which the touch is last detected. Based on the detection signals output from the touch panel 220, the gesture acceptance section 203 identifies the user's gesture input by the user as a slide gesture. Then, the gesture acceptance section 203 outputs a control signal corresponding to the slide gesture to the display control section 202, the job generating section 204, and so on.

The job generating section 204 has the function of generating an image formation job for the image forming apparatus 10 according to the user's gesture, such as a slide gesture, accepted by the gesture acceptance section 203.

As will hereinafter be described in detail, the image formation job generated by the job generating section 204 is, unlike an image formation job generated on the image forming apparatus 10 and containing detailed settings relating to image formation, such as page aggregation, the size of recording paper sheet, image quality, and the destination for sheet output, an image formation job in which only simple settings, such as the specification of a candidate piece of data for image formation and the number of copies to be made, are made. The job generating section 204 generates the image formation job based on an intuitive and simple user's gesture, such as a slide gesture, on an icon displayed on the display section 210.

The communication control section 205 has the function of controlling the communication section 240 to allow the communication section 240 to transfer data to and from the image forming apparatus 10. Particularly, the communication control section 205 allows the communication section 240 to send the image formation job generated by the job generating section 204 to the image forming apparatus 10.

Figure 4:
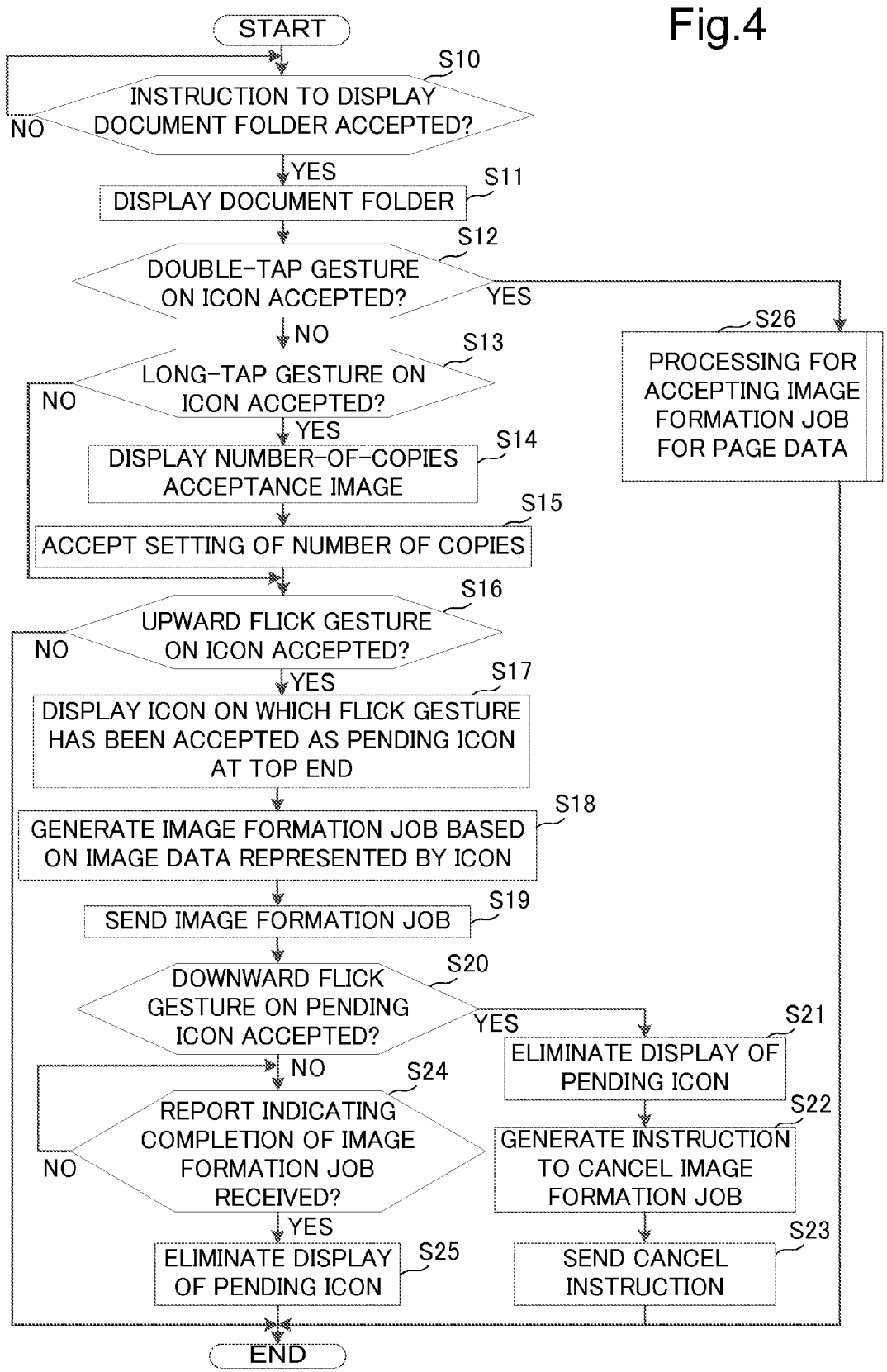
FIG. 4 is a flowchart showing a processing flow of the mobile terminal device according to the one embodiment of the present disclosure.

Next, a description will be given of the operation of the mobile terminal device 20 which have the above-described configuration. FIG. 4 is a flowchart showing a processing flow of the mobile terminal device 20.

When the gesture acceptance section 203 accepts an instruction to display a document folder screen based on a user's gesture on the touch panel 220 (YES in step S10), the display control section 202 allows the display section 210 to display the document folder screen (step S11).

When after the display of the document folder screen the gesture acceptance section 203 accepts a double-tap gesture on any icon presented on the document folder screen (YES in step S12), the mobile terminal device 20 executes processing in step S26. The term double-tap gesture herein refers to a gesture of tapping twice at the same position within a predetermined period of time. As will hereinafter be described in detail, in the processing in step S26, the display control section 202 allows the display section 210 to display a plurality of page images indicating pieces of page data contained in a file represented by the double-tapped icon (see FIG. 9A and so on) and the job generating section 204 generates an image formation job based on a user's gesture, such as a slide gesture, on any of the page images.

On the other hand, if the gesture acceptance section 203 has not accepted any double-tap gesture on any icon presented on the document folder screen (NO in step S12), the gesture acceptance section 203 determines whether or not a long-tap gesture has been made on any icon presented on the document folder screen (step S13). The term long-tap gesture herein refers to a tap gesture held at the same position over a predetermined period of time or longer.

Figure 5:
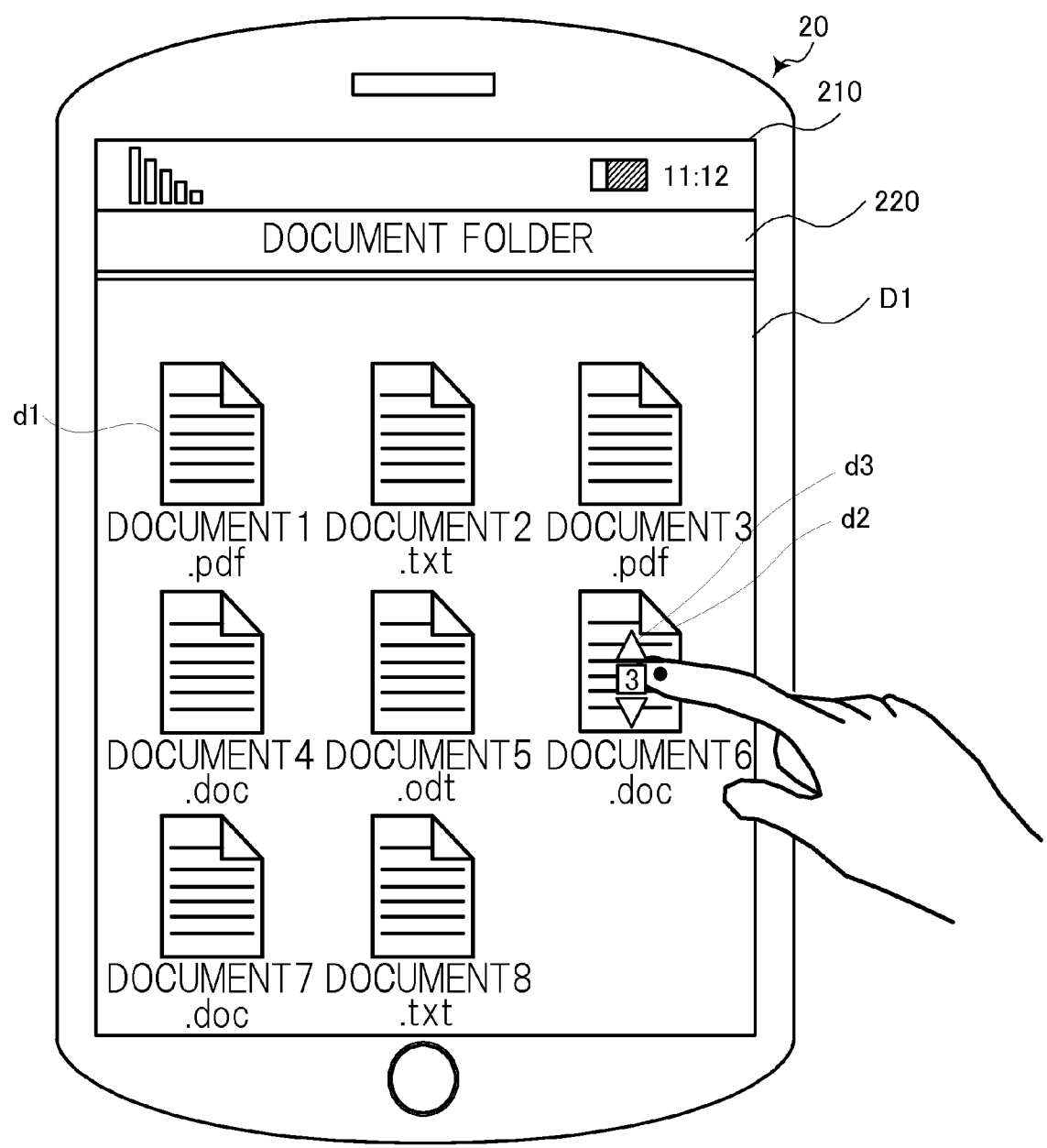
FIG. 5 is a view showing an example of a number-of-copies acceptance image displayed on the display section of the mobile terminal device according to the one embodiment of the present disclosure.

When a long-tap gesture is made on any icon presented on the document folder screen (YES in step S13), the display control section 202 allows the display section 210 to display a predetermined number-of-copies acceptance image (step S14). The number-of-copies acceptance image is an image for accepting the number of copies to be made from a candidate piece of data for image formation represented by the long-tapped icon. FIG. 5 is a view showing an example of a number-of-copies acceptance image displayed on the display section 210. In the example shown in FIG. 5, a long-tap gesture on the icon d2 is made as a gesture for setting the number of copies to be made. In this case, the display control section 202 allows the display section 210 to display a number-of-copies acceptance image d3 near or on top of the icon d2. When making a tap gesture on the number-of-copies acceptance image d3 to increase or decrease the number of copies to be made, the user can set a desired number of copies.

After the display of the number-of-copies acceptance image, the gesture acceptance section 203 accepts the setting of the number of copies based on the tap gesture made on the number-of-copies acceptance image d3 (step S15).

On the other hand, if no long-tap gesture has been made on any icon presented on the document folder screen (NO in step S13), the pieces of processing in steps S14 and S15 are not performed.

Thereafter, the gesture acceptance section 203 determines whether or not a slide gesture in an upward direction, which is a predetermined first direction, has been made on any icon presented on the document folder screen (step S16).

Figure 6A:
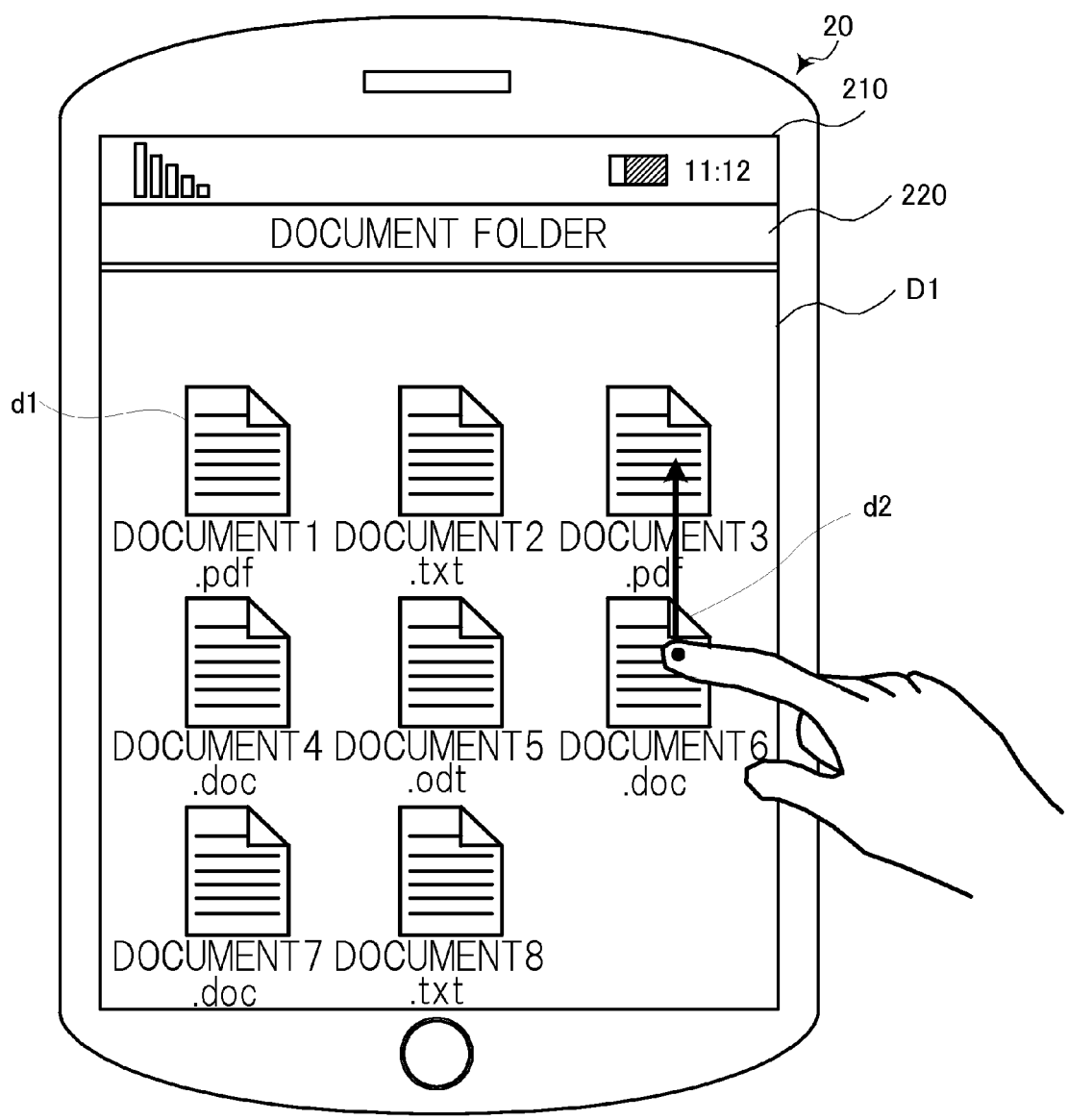
FIG. 6A is a view showing an example of a gesture for entering an image formation job on the mobile terminal device according to the one embodiment of the present disclosure.
Figure 6B:
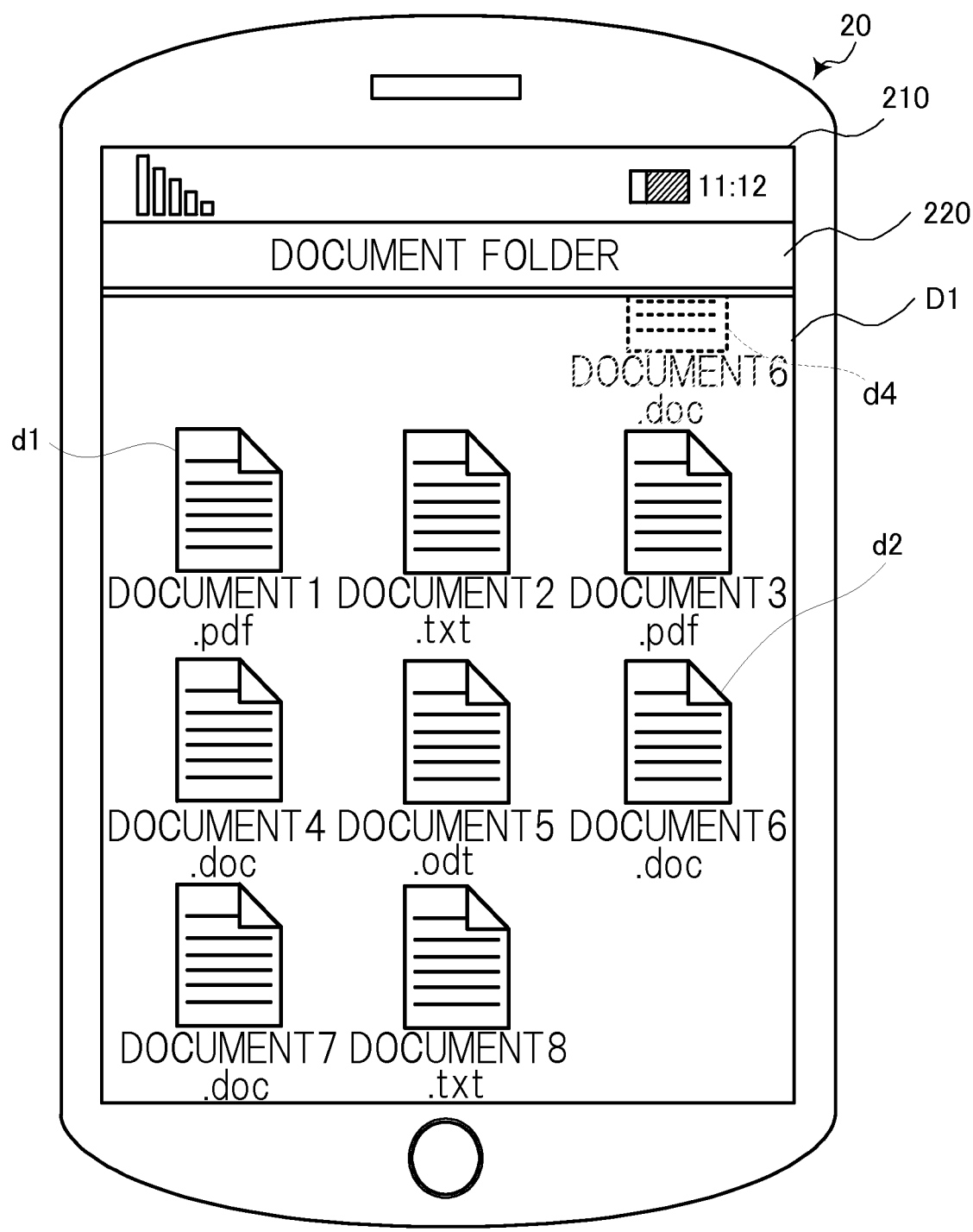
FIG. 6B is a view showing an example of a pending icon displayed on the display section of the mobile terminal device according to the one embodiment of the present disclosure.

When the gesture acceptance section 203 accepts an upward slide gesture on any icon (YES in step S16), the display control section 202 allows the display section 210 to display, at a top end of a display area of the display section 210, the slid icon as a pending icon (pending image) indicating a piece of data pending on the image forming apparatus 10 (step S17). In the example shown in FIG. 6A, an upward slide gesture on the icon d2 of the plurality of icons arranged on the document folder screen D1 is made as a gesture for entering an image formation job. In this case, as shown in FIG. 6B, the display control section 202 allows the display section 210 to display a pending icon d4 formed of a semi-transparent lower portion of the icon d2 at the top end of the display area of the display section 210.

After the piece of processing in step S17, the job generating section 204 generates an image formation job to allow the image forming apparatus 10 to perform image formation based on a file represented by the icon on which the gesture acceptance section 203 has accepted the slide gesture in the piece of processing in step S16 (step S18). The job generating section 204 allows the storage section 230 to store the generated image formation job.

If in the piece of processing in step S13 the gesture acceptance section 203 has not accepted any long-tap gesture on any icon, the job generating section 204, in a piece of processing in step S18, generates an image formation job specifying the file as a candidate piece of data for image formation.

On the other hand, when the gesture acceptance section 203 accepts a long-tap gesture on any icon in the piece of processing in step S13 and then accepts the setting of the number of copies in the piece of processing in step S15, the job generating section 204, in the piece of processing in step S18, generates an image formation job specifying not only the file as a candidate piece of data for image formation but also the number of copies set in the piece of processing in step S15.

After the piece of processing in step S18, the communication control section 205 allows the communication section 240 to send the image formation job generated by the job generating section 204 to the image forming apparatus 10 (step S19).

Although not given in the flowchart shown in FIG. 4, the communication control section 205 allows the communication section 240 to send, prior to the piece of processing in step S19, to the image forming apparatus 10 an authentication request containing a password and so on for use in authenticating the mobile terminal device 20 in the image forming apparatus 10. In the image forming apparatus 10, the authenticating section 106 determines whether or not the control section 101 executes the image formation job sent from the mobile terminal device 20 by authenticating or not authenticating the mobile terminal device 20 based on the authentication request. When the authenticating section 106 succeeds in authenticating the mobile terminal device 20, the communication control section 105 allows the communication section 170 to send a notification signal indicating a successful authentication to the mobile terminal device 20. The piece of processing in step S19 is performed after the mobile terminal device 20 receives the notification signal indicating the successful authentication.

By making an upward slide gesture on a desired file as if launching out an image formation job from the mobile terminal device 20 toward the image forming apparatus 10 through the pieces of processing in steps 16 to 19, the user can enter into the image forming apparatus 10 the image formation job to allow the file to be subjected to image formation. Therefore, the mobile terminal device 20 according to the one embodiment of the present disclosure can provide an operating method for entering an image formation job giving the user an intuitive and novel operating feeling.

After the sending of the image formation job, the gesture acceptance section 203 determines whether or not a slide gesture in a downward direction (second direction), which is a direction opposite to the predetermined first direction, has been made on the pending icon (step S20).

When the gesture acceptance section 203 accepts a downward slide gesture on the pending icon (YES in step S20), the display control section 202 allows the display section 210 to eliminate the display of the pending icon (step S21).

Then, the job generating section 204 generates a cancel instruction to cancel the image formation job sent in the piece of processing in step S19 (step S22).

Figure 7A:
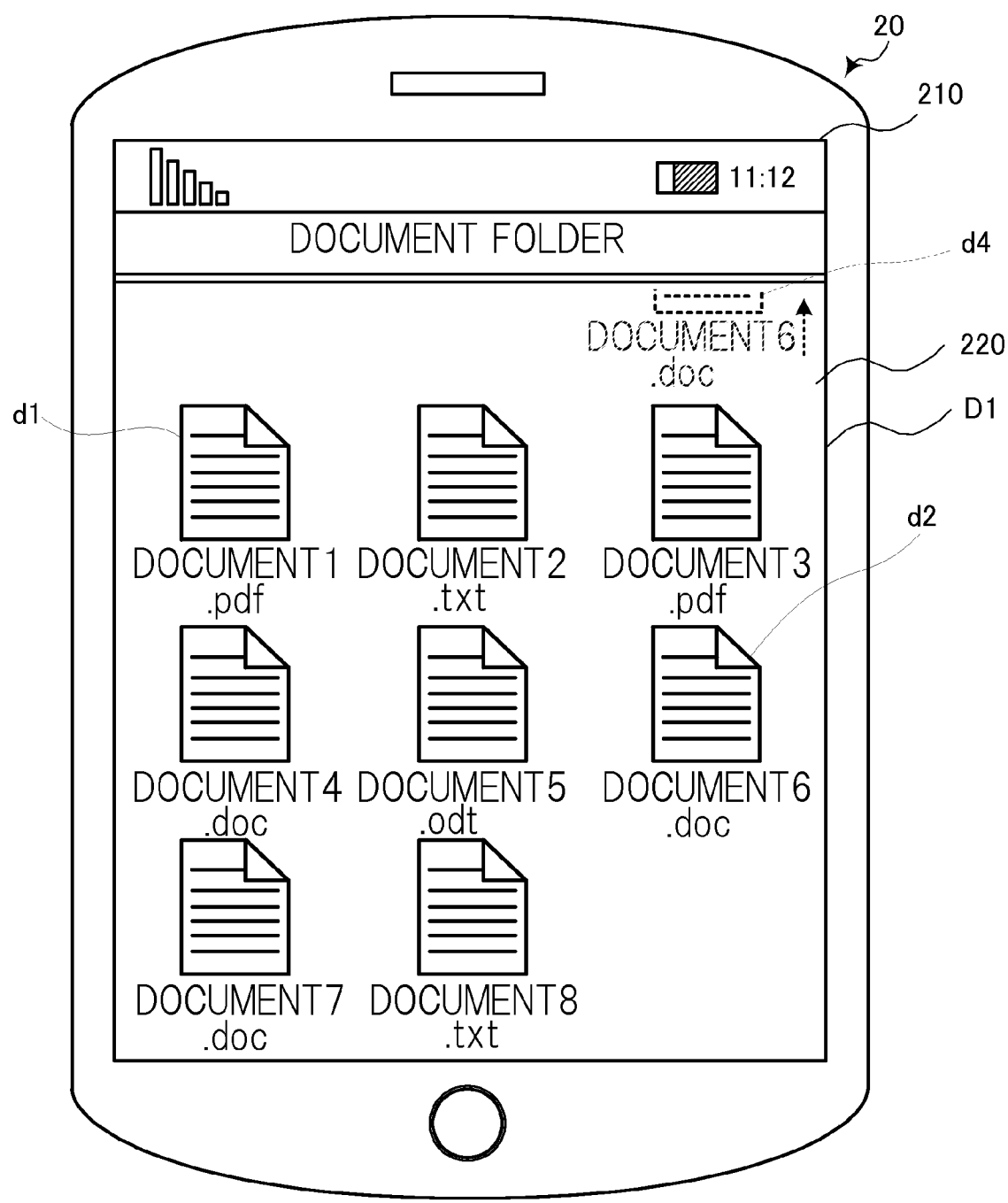
FIG. 7A is a view showing how the pending icon is eliminated from the display section of the mobile terminal device according to the one embodiment of the present disclosure.
Figure 7B:
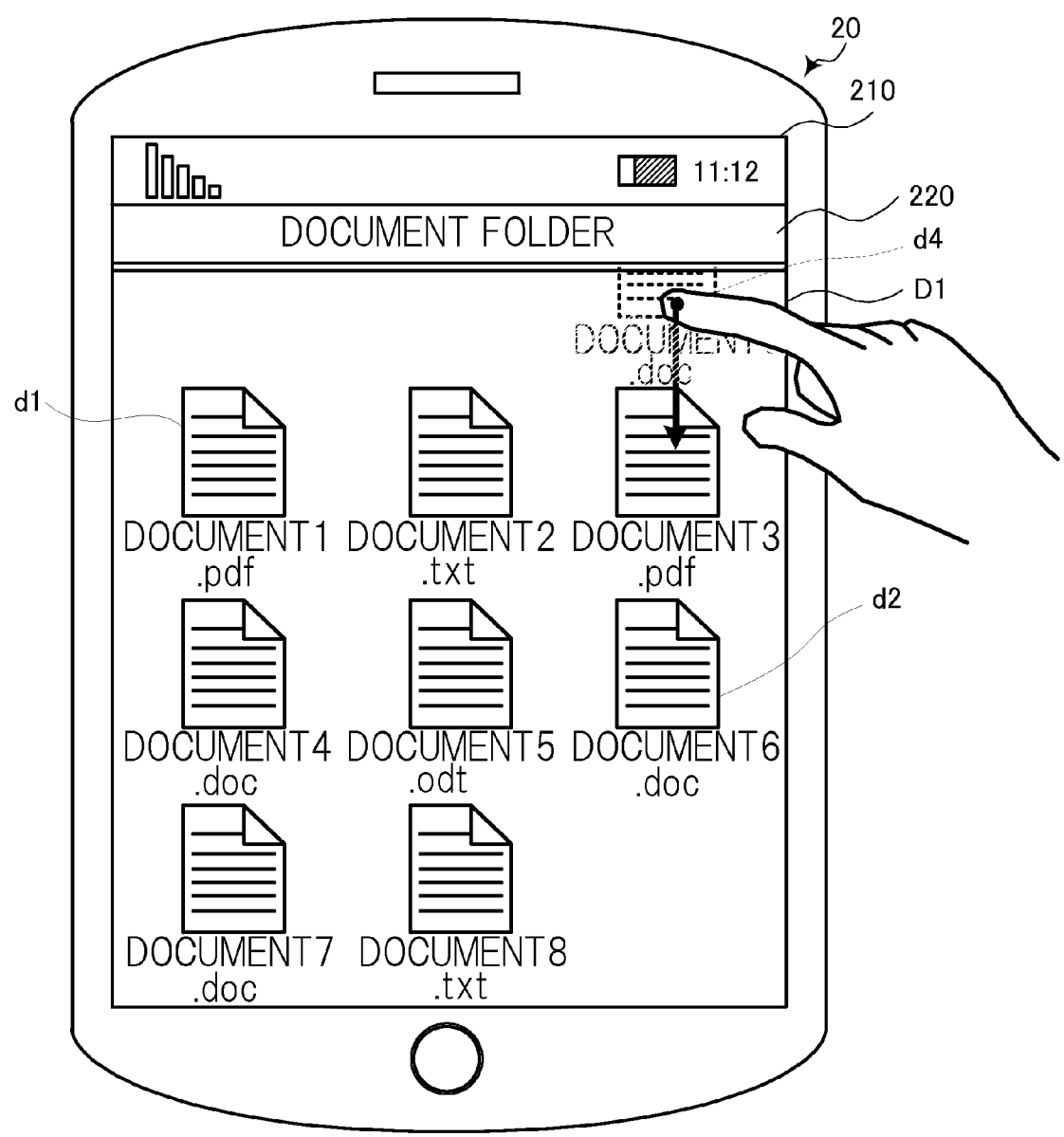
FIG. 7B is a view showing an example of a gesture for cancelling an image formation job on the mobile terminal device according to the one embodiment of the present disclosure.

After the piece of processing in step S22, the communication control section 205 allows the communication section 240 to send the cancel instruction generated by the job generating section 204 to the image forming apparatus 10 (step S23). In the example shown in FIG. 7B, a downward slide gesture on the pending icon d4 displayed at the top end of the display area of the display section 210 is made as a gesture for cancelling an image formation job. In this case, the job generating section 204 generates a cancel instruction to cancel an image formation job for the file "Document 6.doc" represented by the pending icon d4.

On the other hand, if the gesture acceptance section 203 has not accepted any downward slide gesture on any pending icon (NO in step S20), the display control section 202 stands by until a report notifying of the completion of the image formation job sent in the piece of processing in step S19 is sent from the image forming apparatus 10 and the communication section 240 receives the report (step S24). Then, when the communication section 240 receives the report notifying of the completion of the image formation job (YES in step S24), the display control section 202 allows the display section 210 to eliminate the display of the pending icon (step S25). In doing so, the display control section 202 allows the display section 210 to eliminate the display of the pending icon by moving up the pending icon displayed at the top end of the display area of the display section 210 to the outside of the display area. In the example shown in FIG. 7A, as a result of completion of the image formation job for the file "Document 6.doc" on the image forming apparatus 10, the pending icon d4 is moved out of the display area of the display section 210 (see the arrow in the figure).

In this relation, in the previously described technique for, upon acceptance of a slide gesture in a predetermined direction on an icon representing a candidate piece of data for image formation, accepting an image formation job to allow an image forming apparatus to form an image of the piece of data represented by the icon, the user cannot easily know whether or not the slide gesture in the predetermined direction for entering the image formation job has been correctly recognized and the image formation job has been accepted by the image forming apparatus. For example, if a number of image formation jobs are concentrated in the image forming apparatus, it takes long time for each image formation job to be executed after the acceptance thereof. In such a case, in the above technique previously described, since the user cannot know whether or not the image formation job has been accepted by the image forming apparatus, the user may erroneously assume that a slide gesture in the predetermined direction has not correctly been made. As a result of this erroneous assumption, the user may repeat the slide gesture in the predetermined direction a plurality of times, so that a plurality of identical image formation jobs may be entered into the image forming apparatus.

Unlike the above, in the above pieces of processing in steps S20 to S25, the display control section 202 allows the display section 210 to keep on displaying a pending icon until an image formation job is executed by the image forming apparatus 10 since the sending of the image formation job, i.e., while the image formation job is pending on the image forming apparatus 10. By making an upward slide gesture for entering an image formation job and then confirming the presence of a pending icon displayed at a top end of the display area of the display section 210, the user can know that the upward slide gesture has been correctly recognized by the mobile terminal device 20 and the image formation job has been sent to the image forming apparatus 10. Furthermore, as long as the pending icon is displayed on the display section 210, the user can know that the image formation job is pending on the image forming apparatus 10. Thus, even if a number of image formation jobs are concentrated in the image forming apparatus 10, so that it takes long time for each image formation job to be executed after the upward slide gesture for entering the image formation job, the user can be prevented from erroneously assuming that the upward slide gesture has not been recognized by the mobile terminal device 20. Therefore, the mobile terminal device 20 according to the one embodiment of the present disclosure can avoid that the user repeats an upward slide gesture on an icon a plurality of times, resulting in entry of a plurality of identical image formation jobs into the image forming apparatus 10.

In addition, by making a downward slide gesture on a pending icon displayed at the top end of the display area of the display section 210 as if withdrawing an image formation job from the image forming apparatus 10 to the mobile terminal device 20, the user can enter into the image forming apparatus 10 an instruction to cancel the image formation job. Therefore, the mobile terminal device 20 according to the one embodiment of the present disclosure can provide an operating method for entering an instruction to cancel an image formation job giving the user an intuitive and novel operating feeling.

Figure 8:
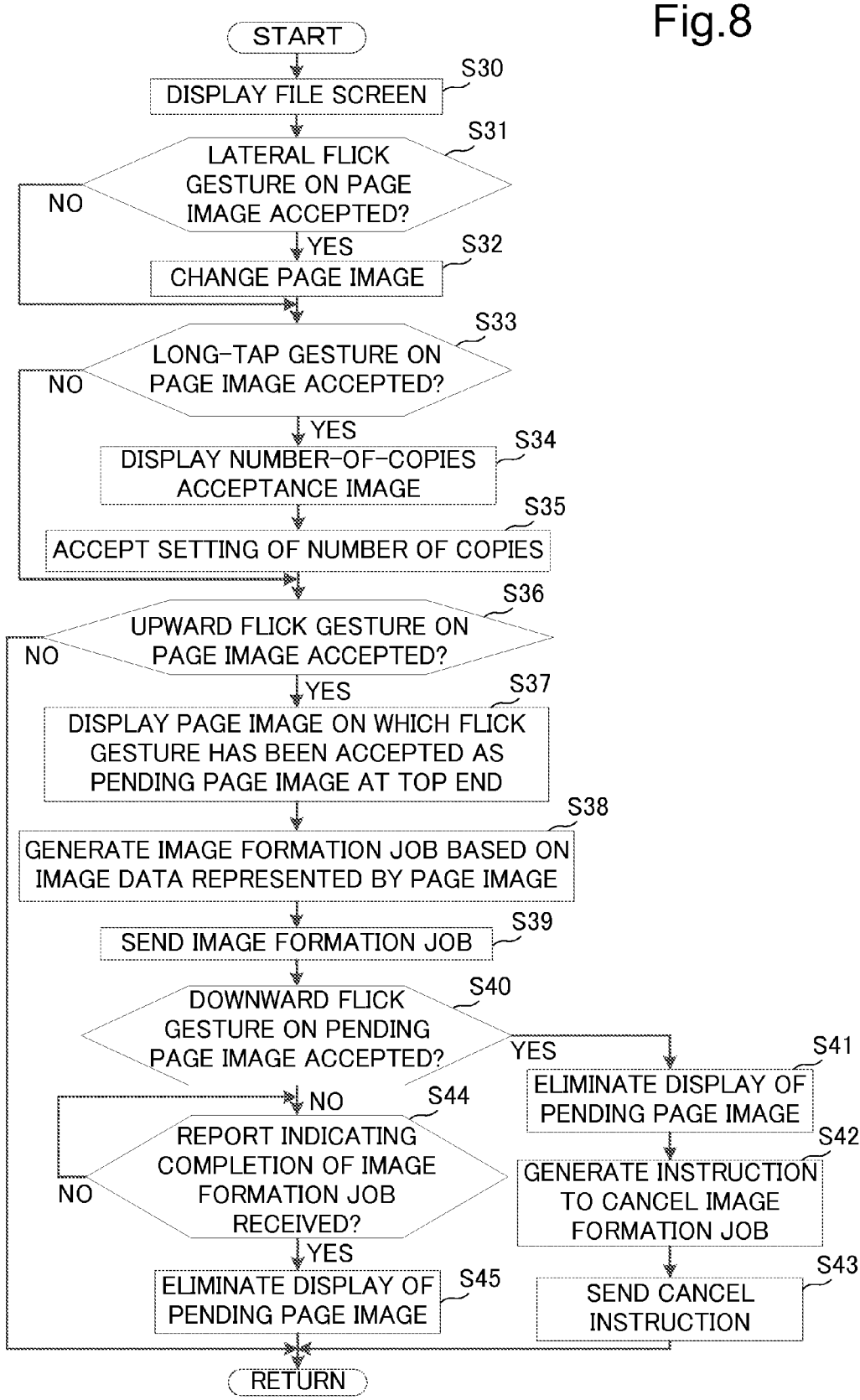
FIG. 8 is a flowchart showing a flow of processing in step S26 shown in FIG. 4 in the mobile terminal device according to the one embodiment of the present disclosure.

Next, a description will be given of the detailed contests of the previously described processing in step S26. FIG. 8 is a flowchart showing a flow of processing in step S26 in the mobile terminal device 20.

Figure 9A:
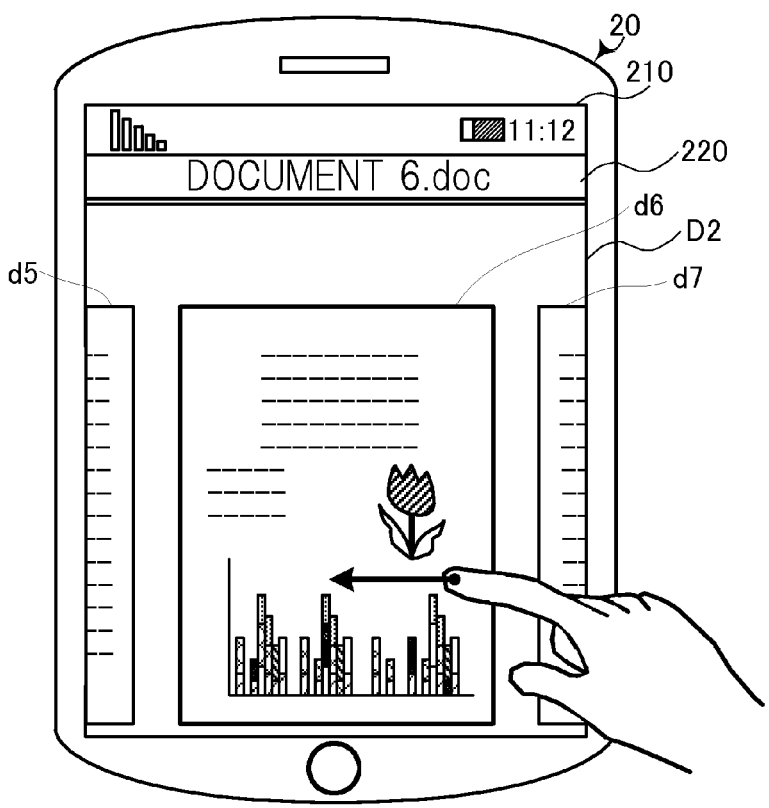
FIG. 9A is a view showing an example of a file screen displayed on the display section of the mobile terminal device according to the one embodiment of the present disclosure.

The display control section 202 allows the display section 210 to display a predetermined file screen (step S30). The file screen presents a plurality of page images (candidate images) indicating pieces of page data which are contained in the file selected in the piece of processing in step S12 and serving as candidate pieces of data for image formation. FIG. 9A is a view showing an example of a file screen displayed on the display section 210. The file screen D2 shown in FIG. 9A presents page images d5, d6, d7 representing pieces of page data contained in the file "Document 6.doc".

When the gesture acceptance section 203 accepts a lateral slide gesture on a page image in the file screen (YES in step S31), the display control section 202 allows the display section 210 to change the page image being displayed (step S32). In the example shown in FIG. 9A, a leftward slide gesture on the page image d6 is made as a gesture for changing the page image. In this case, the display control section 202 allows the display section 210 to change the page image being displayed to the page image d7 following the page image d6. On the other hand, when the user makes a rightward slide gesture on the page image d6, the display control section 202 allows the display section 210 to change the page image being displayed to the page image d5 preceding the page image d6.

Figure 9B:
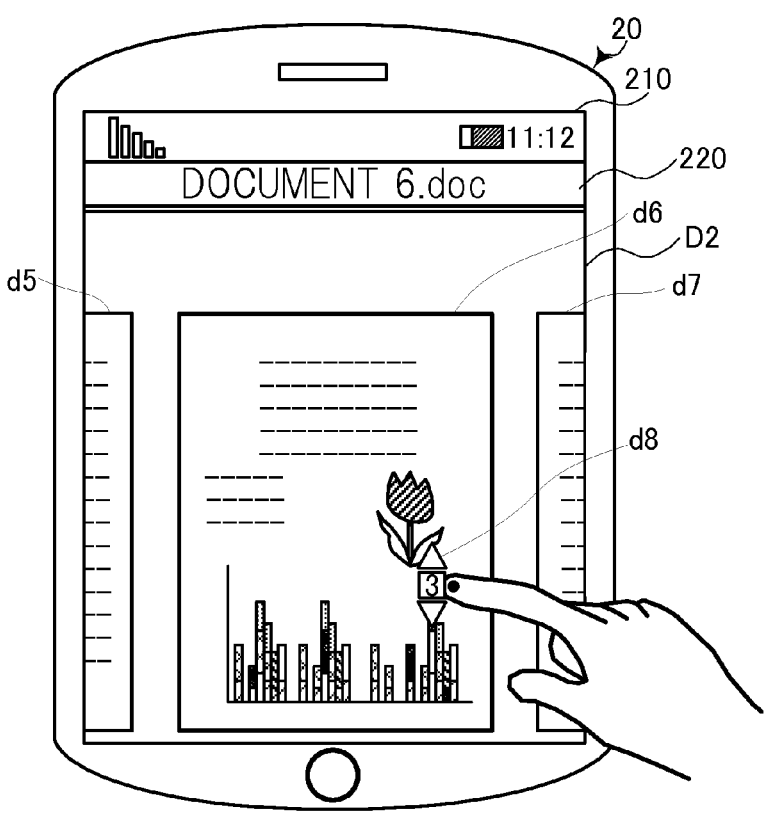
FIG. 9B is a view showing another example of a number-of-copies acceptance image displayed on the display section of the mobile terminal device according to the one embodiment of the present disclosure.

Furthermore, when the gesture acceptance section 203 accepts a long-tap gesture on any page image in the file screen (YES in step S33), the display control section 202, like the piece of processing in step S14, allows the display section 210 to display a predetermined number-of-copies acceptance image (step S34). In the example shown in FIG. 9B, a long-tap gesture on the page image d6 is made as a gesture for setting the number of copies to be made. In this case, the display control section 202 allows the display section 210 to display a number-of-copies acceptance image d8 near or on top of the page image d6. After the display of the number-of-copies acceptance image, the gesture acceptance section 203 accepts the setting of the number of copies based on the tap gesture made on the number-of-copies acceptance image d8 (step S35).

Figure 10A:
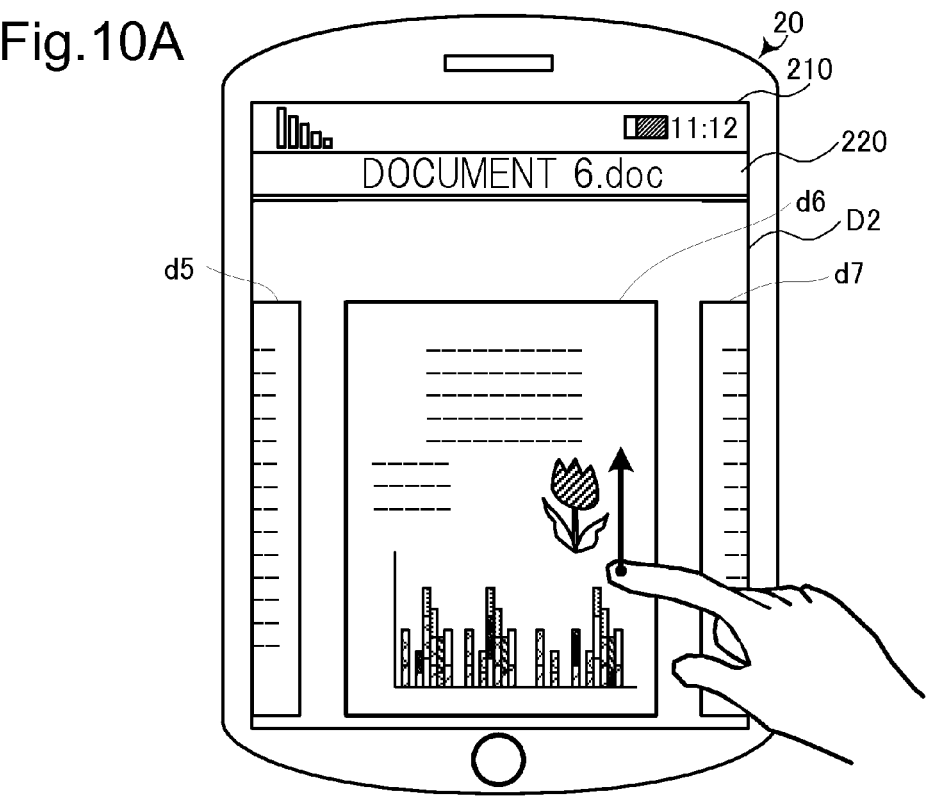
FIG. 10A is a view showing another example of a gesture for entering an image formation job on the mobile terminal device according to the one embodiment of the present disclosure.
Figure 10B:
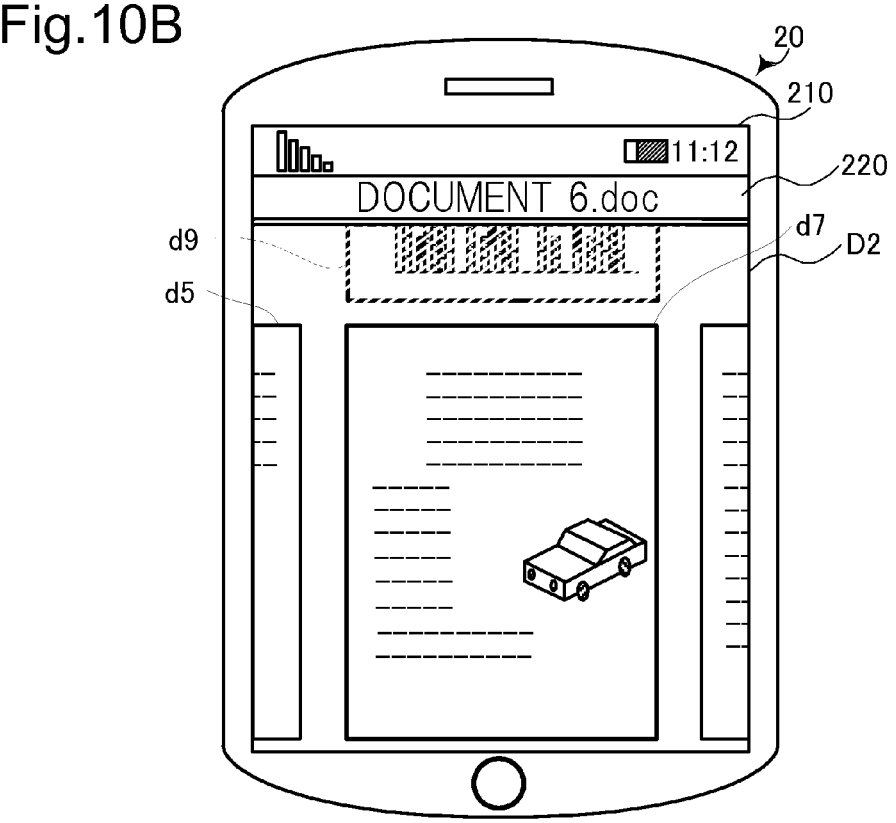
FIG. 10B is a view showing an example of a pending page image displayed on the display section of the mobile terminal device according to the one embodiment of the present disclosure.

Next, when the gesture acceptance section 203 accepts an upward slide gesture on any page image in the file screen (YES in step S36), the display control section 202 allows the display section 210 to display, at a top end of the display area of the display section 210, the slid page image as a pending page image (pending image) indicating a piece of data pending on the image forming apparatus 10 (step S37). In the example shown in FIG. 10A, an upward slide gesture on the page image d6 of the plurality of page images arranged on the file screen D2 is made as a gesture for entering an image formation job. In this case, as shown in FIG. 10B, the display control section 202 allows the display section 210 to display a pending page image d9 formed of a semi-transparent lower portion of the page image d6 at the top end of the display area of the display section 210. Furthermore, the display control section 202 allows the display section 210 to change the page image being displayed to the page image d7 following the page image d6.

After the piece of processing in step S37, the job generating section 204 generates an image formation job to allow the image forming apparatus 10 to perform image formation based on a piece of page data represented by the page image on which the gesture acceptance section 203 has accepted the slide gesture in the piece of processing in step S36 (step S38). Then, the communication control section 205 allows the communication section 240 to send the image formation job generated by the job generating section 204 to the image forming apparatus 10 (step S39).

When after the sending of the image formation job the gesture acceptance section 203 accepts a downward slide gesture on the pending page image (YES in step S40), the display control section 202 allows the display section 210 to eliminate the display of the pending page image (step S41).

Figure 11A:
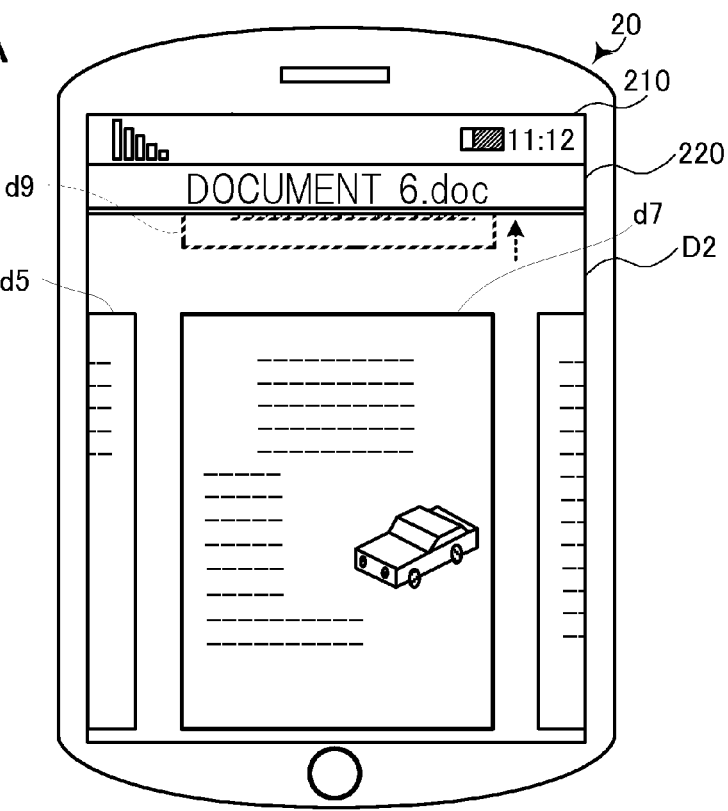
FIG. 11A is a view showing how the pending page image is eliminated from the display section of the mobile terminal device according to the one embodiment of the present disclosure.
Figure 11B:
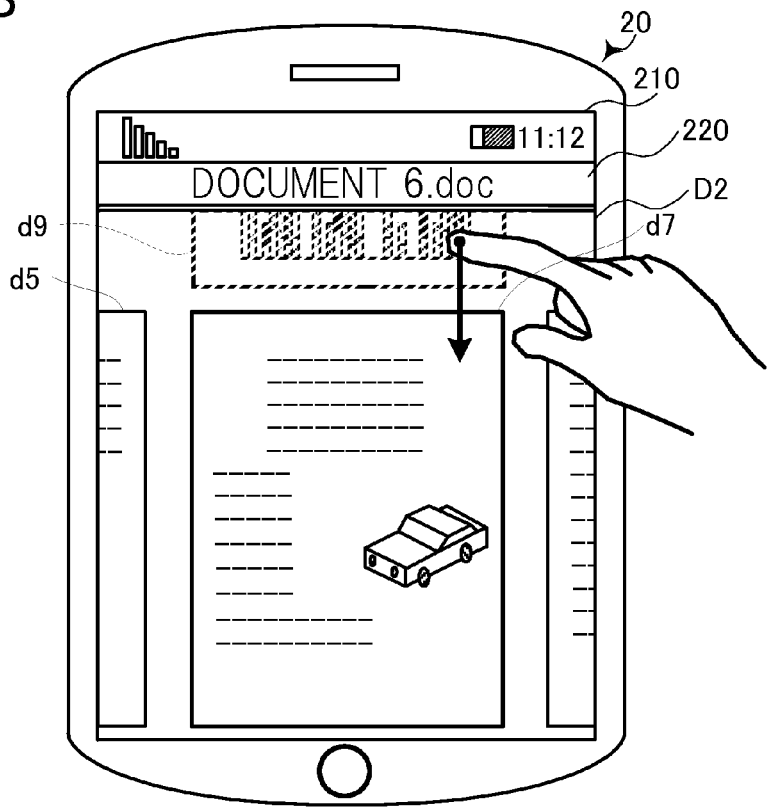
FIG. 11B is a view showing another example of a gesture for cancelling an image formation job on the mobile terminal device according to the one embodiment of the present disclosure.

Then, the job generating section 204 generates a cancel instruction to cancel the image formation job sent in the piece of processing in step S39 (step S42). Furthermore, the communication control section 205 allows the communication section 240 to send the cancel instruction generated by the job generating section 204 to the image forming apparatus 10 (step S43). In the example shown in FIG. 11B, a downward slide gesture on the pending page image d9 displayed at the top end of the display area of the display section 210 is made as a gesture for cancelling an image formation job. In this case, the job generating section 204 generates a cancel instruction to cancel an image formation job for a piece of page data represented by the pending page image d9.

On the other hand, if the gesture acceptance section 203 has not accepted any downward slide gesture on any pending page image (NO in step S40), the display control section 202 stands by until a report notifying of the completion of the image formation job sent in the piece of processing in step S39 is sent from the image forming apparatus 10 and the communication section 240 receives the report (step S44). Then, when the communication section 240 receives the report notifying of the completion of the image formation job (YES in step S44), the display control section 202 allows the display section 210 to eliminate the display of the pending page image (step S45). In doing so, the display control section 202 allows the display section 210 to eliminate the display of the pending page image by moving up the pending page image displayed at the top end of the display area of the display section 210 to the outside of the display area. In the example shown in FIG. 11A, as a result of completion of the image formation job on the image forming apparatus 10, the pending page image d9 is moved out of the display area of the display section 210 (see the arrow in the figure).

By, as just described, performing, also on a page image representing a piece of page data as a candidate piece of data for image formation, the same gesture as made on an icon representing a file as a candidate piece of data for image formation, the user can enter an image formation job for the image forming apparatus 10.

The present disclosure is not limited to the configuration of the above embodiment and can be modified in various ways.

Figure 12A:
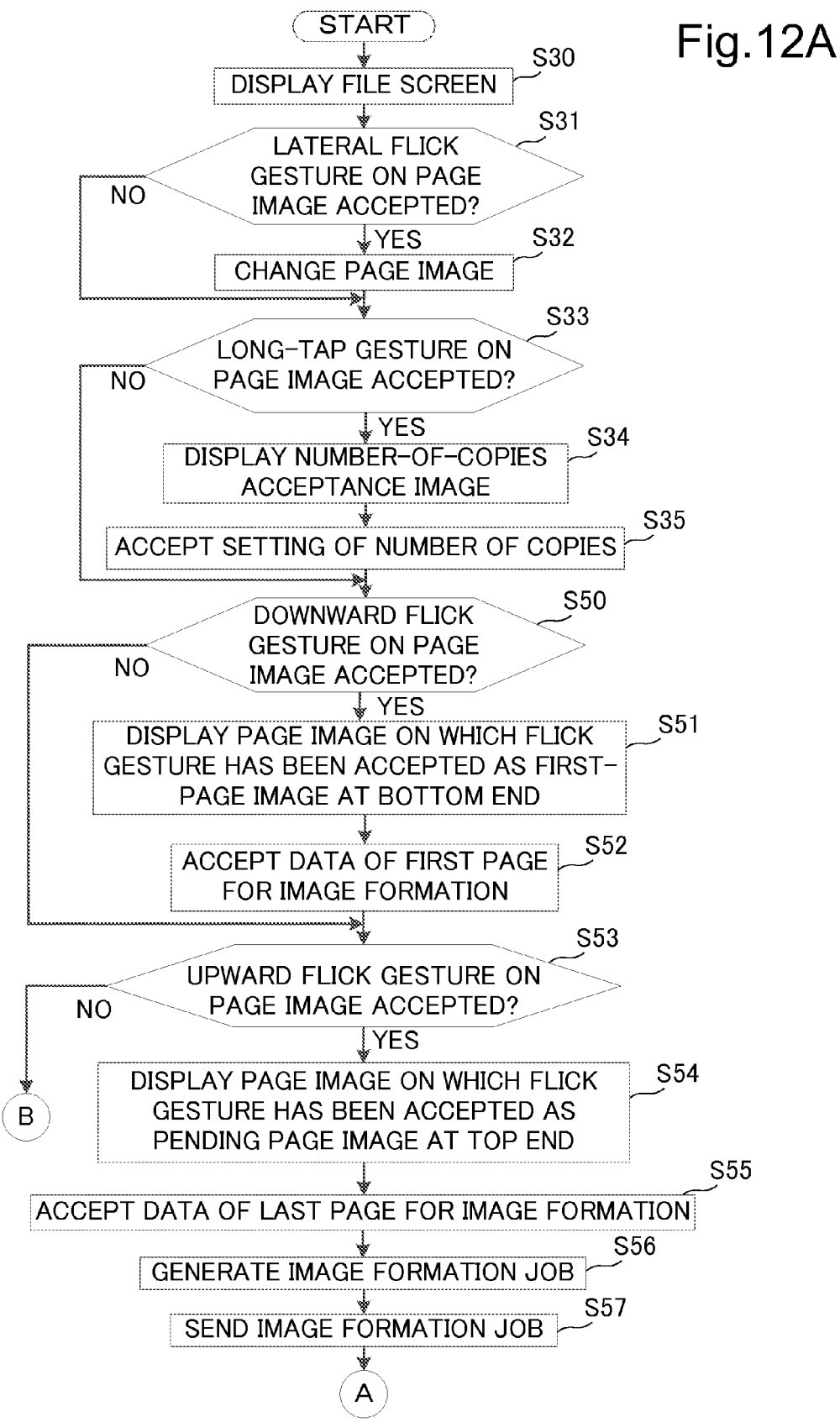
FIG. 12A and FIG. 12B are flowcharts showing a processing flow of a mobile terminal device according to a modification.
Figure 12B:
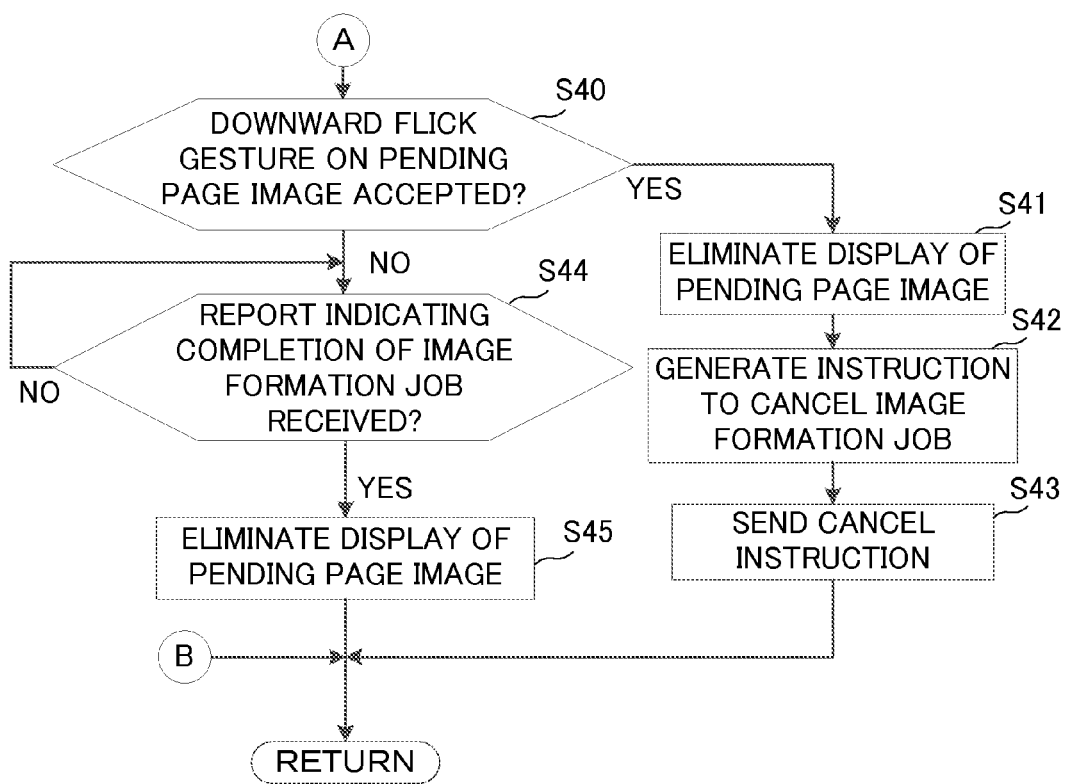

FIG. 12A and FIG. 12B are flowcharts showing a flow of processing in step 26 in a mobile terminal device 20 according to a modification. The same pieces of processing as those in the flowchart of FIG. 8 are designated by the same references and further explanation thereof will be omitted.

Figure 13A:
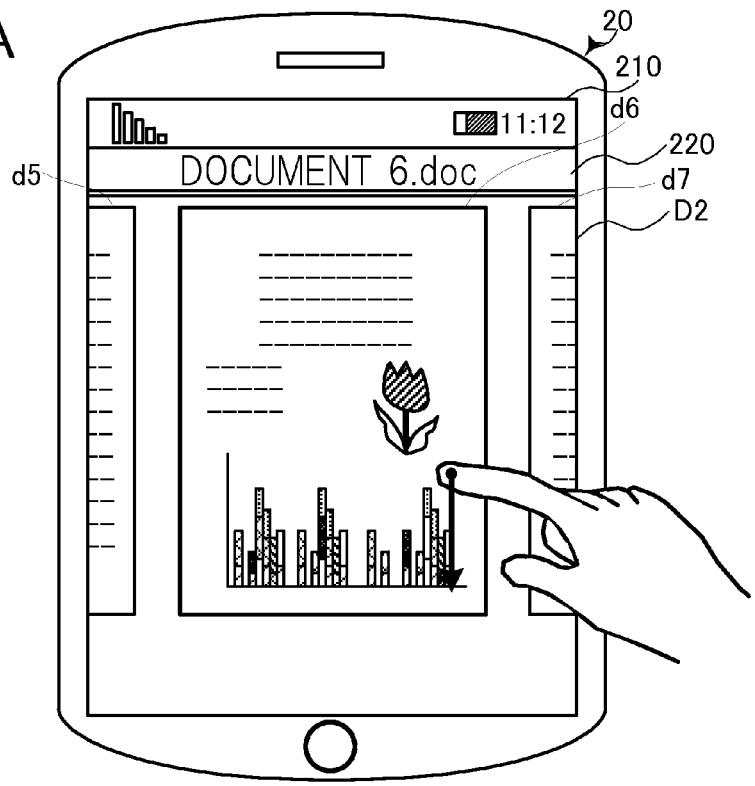
FIG. 13A is a view showing an example of a gesture for setting a piece of data for a first page on the mobile terminal device according to the modification.
Figure 13B:
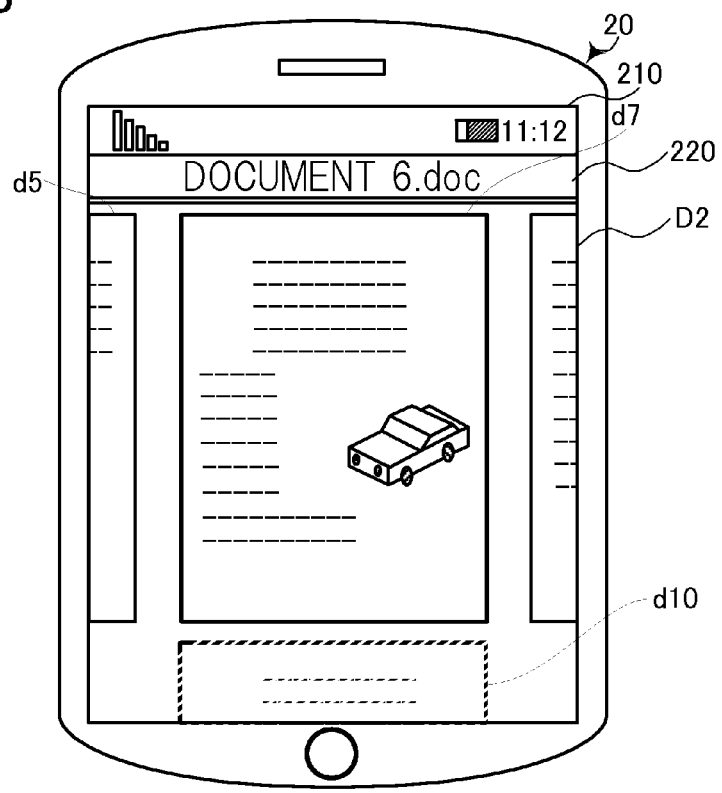
FIG. 13B is a view showing an example of a first-page image displayed on a display section of the mobile terminal device according to the modification.

When the gesture acceptance section 203 accepts a slide gesture in a downward direction (second direction) opposite to the predetermined first direction on a page image in a file screen (step S50), the display control section 202 allows the display section 210 to display the slid page image as a first-page image representing a piece of data of a first page for image formation at a bottom end of the display area of the display section 210 (step S51). In the example shown in FIG. 13A, a downward slide gesture on the page image d6 of the plurality of page images arranged on the file screen D2 is made as a gesture for specifying a piece of data of a first page. In this case, as shown in FIG. 13B, the display control section 202 allows the display section 210 to display a first-page image d10 formed of a semi-transparent upper portion of the page image d6 at the bottom end of the display area of the display section 210. Furthermore, the display control section 202 allows the display section 210 to change the page image being displayed to the page image d7 following the page image d6.

The gesture acceptance section 203 accepts, as a piece of data of a first page for image formation, a piece of page data represented by the page image on which the downward slide gesture has been made (step S52). The gesture acceptance section 203 allows the storage section 230 to store the accepted piece of data of the first page.

Figure 14A:
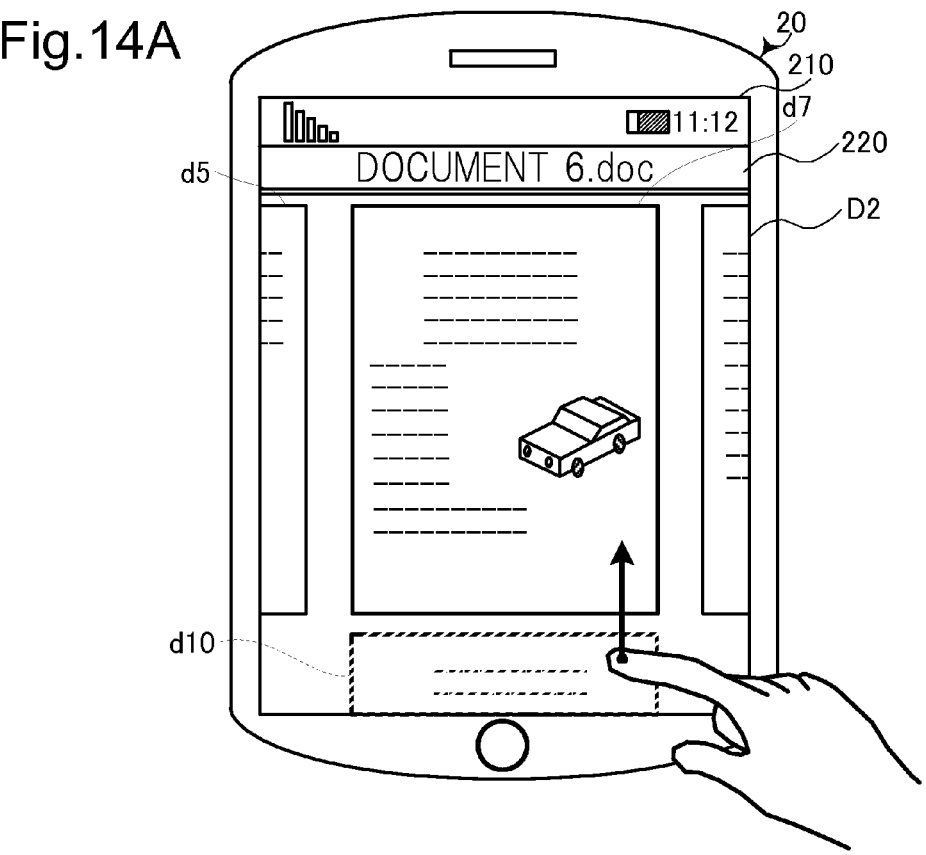
FIG. 14A is a view showing an example of a gesture for cancelling the piece of data for the first page on the mobile terminal device according to the modification.

When, as shown in FIG. 14A, an upward slide gesture on the first-page image d10 is made as a gesture for cancelling the piece of data of the first page, the display control section 202 allows the display section 210 to eliminate the display of the first-page image d10. Then, the gesture acceptance section 203 allows the storage section 230 to delete the piece of page data accepted as a piece of data of a first page in the piece of processing in step S52.

When, after the piece of processing in step S52, the gesture acceptance section 203 accepts an upward slide gesture on a page image (YES in step S53), the display control section 202 allows the display section 210 to display, at a top end of the display area of the display section 210, the slid page image as a pending page image indicating a piece of data pending on the image forming apparatus 10 (step S54).

Then, the gesture acceptance section 203 accepts, as a piece of data of a last page for image formation, a piece of page data represented by the page image on which the upward slide gesture has been made (step S55). The gesture acceptance section 203 allows the storage section 230 to store the accepted piece of data of the last page.

Figure 14B:
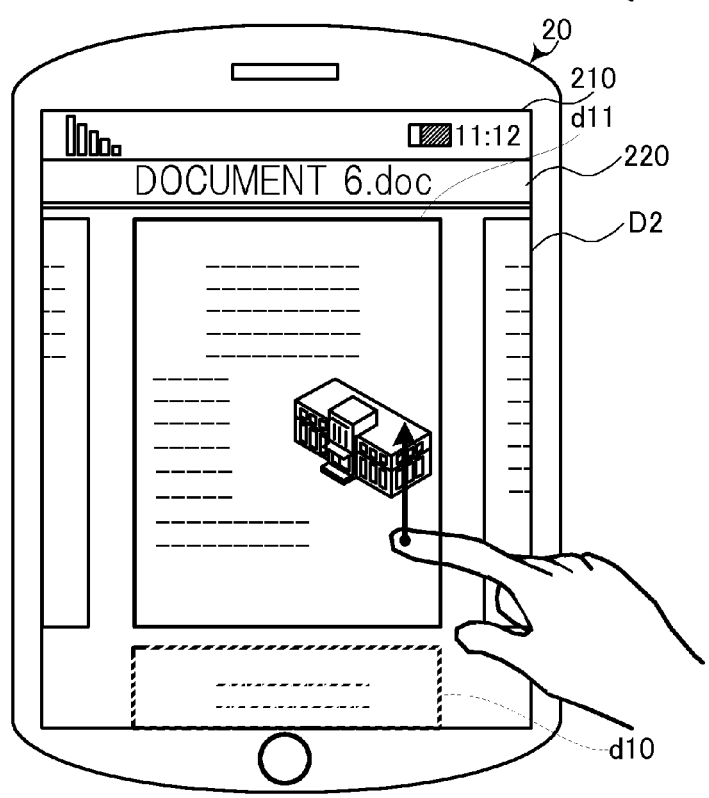
FIG. 14B is a view showing an example of a gesture for setting a piece of data for a last page on the mobile terminal device according to the modification.

After the piece of processing in step S55, the job generating section 204 generates an image formation job to allow the image forming apparatus 10 to perform image formation based on pieces of page data from that of the first page to that of the last page accepted by the gesture acceptance section 203 in the pieces of processing in steps S52 and S55 and stored in the storage section 230 (step S56). When, as shown in FIG. 14B, an upward slide gesture on a page image d11 of the plurality of page images arranged on the file screen D2 is made as a gesture for specifying a piece of data of a last page, the job generating section 204 generates an image formation job to allow the image forming apparatus 10 to perform image formation based on pieces of page data from that represented by the first-page image d10 to that represented by the page image d11.

In the mobile terminal device 20 according to the modification, as just described, the user can enter an image formation job specifying pieces of page data on the first and last pages for image formation by intuitive and simple user's gestures formed of downward and upward slide gestures on desired page images.

Although in the above embodiment and modification the mobile terminal device has been taken as an example of the display input apparatus, the present disclosure is not necessarily limited to this. The display input apparatus applicable as one embodiment of the present disclosure may be, besides the mobile terminal device, for example, an image forming apparatus, a personal computer or a television set.

The display input control program described in the above embodiment and modification may be one stored on a computer-readable non-transitory recording medium, such as a hard disk, a CD-ROM, a DVD-ROM or a semiconductor memory.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A display input apparatus comprising:
    a display section configured to display a plurality of candidate images representing candidate pieces of data for image formation on an image forming apparatus;
    a touch panel disposed in front of the display section;
    a gesture acceptance section configured to accept a user's gesture on the touch panel;
    a display control section configured to control a display operation of the display section according to the user's gesture accepted by the gesture acceptance section;
    a job generating section configured to generate an image formation job for the image forming apparatus according to the user's gesture accepted by the gesture acceptance section;
    a communication section capable of data transfer to and from the image forming apparatus; and
    a communication control section configured to control a communication operation of the communication section,
    wherein the job generating section is further configured to, when the gesture acceptance section accepts a slide gesture in a predetermined first direction on one of the plurality of candidate images, generate the image formation job to allow the image forming apparatus to perform image formation based on the candidate piece of data for image formation represented by the one candidate image,
    the communication control section is further configured to allow the communication section to send the image formation job generated by the job generating section to the image forming apparatus, and
    the display control section is further configured to, when the gesture acceptance section accepts the slide gesture in the first direction on the one candidate image, allow the display section; to display, at an end of the display area of the display section in the first direction, the one candidate image as a pending image indicating a piece of data pending on the image forming apparatus; and to continue the state of displaying the one candidate image at an end of a display area in the first direction until the communication section receives from the image forming apparatus a report indicating a completion of the image formation job, and when the communication section receives a report indicating a completion of the image formation job from the image forming apparatus, allow the display section to release the state of displaying and to eliminate the display of the pending image.

2. The display input apparatus according to claim 1, wherein
when the gesture acceptance section accepts a slide gesture in a second direction opposite to the first direction on the pending image after accepting the slide gesture in the first direction on the one candidate image and before the communication section receives the report indicating the completion of the image formation job, the job generating section generates a cancel instruction to cancel the image formation job, and
the communication control section allows the communication section to send the cancel instruction generated by the job generating section to the image forming apparatus.

3. The display input apparatus according to claim 1, wherein the display control section is further configured to allow the display section to eliminate the display of the pending image by moving the pending image in the first direction to the outside of the display area.

4. The display input apparatus according to claim 1, wherein
when the gesture acceptance section accepts a tap gesture held on the one candidate image over a predetermined period of time or longer, the display control section allows the display section to display a number-of-copies acceptance image for accepting a number of copies to be made from the candidate piece of data for image formation represented by the one candidate image, and
the job generating section generates an image formation job to allow the image forming apparatus to perform the image formation by the number of copies set according to a user's gesture on the number-of-copies acceptance image.

5. The display input apparatus according to claim 1, wherein the display control section is further configured to allow the display section to display as the candidate image an icon representing a file as the candidate piece of data for image formation.

6. The display input apparatus according to claim 1, wherein the display control section is further configured to allow the display section to display as the candidate image a page image representing a piece of page data as the candidate piece of data for image formation.

7. The display input apparatus according to claim 1, wherein the display control section is further configured to allow the display section to display as the candidate image an icon representing a file as the candidate piece of data for image formation and, when the gesture acceptance section accepts a predetermined gesture on the icon, allow the display section to display as the candidate image a page image representing a piece of page data as the candidate piece of data for image formation.

8. The display input apparatus according to claim 1, wherein the display control section is further configured to, when the gesture acceptance section accepts the slide gesture in the first direction on the one candidate image, allow the display section to display, at the end of the display area of the display section in the first direction, the one semi-transparentized candidate image as the pending image.

9. The display input apparatus according to claim 6, wherein
when the gesture acceptance section accepts a slide gesture in a second direction opposite to the first direction on one of the plurality of page images, the display control section allows the display section to display, at an end of the display area of the display section in the second direction, the one page image as a first-page image representing a piece of data of a first page for image formation, and
the job generating section generates, when the gesture acceptance section accepts the slide gesture in the first direction on the page image different from the one page image in the state of displaying the one page image at the end of the display area of the display section in the second direction after the gesture acceptance section accepts the slide gesture in the second direction on the one page image of the plurality of page images an image formation job to allow the image forming apparatus to perform image formation in which the piece of page data represented by the first-page image is the piece of data of the first page for image formation and in which the piece of page data represented by the different page image is a piece of page data of a last page for image formation.

10. The display input apparatus according to claim 9, wherein the display control section is further configured to allow the display section to continue the state of displaying the one page image at the end of the display area in the second direction until the gesture acceptance section accepts the slide gesture in the first direction on the page image different from the one page image after the gesture acceptance section accepts the slide gesture in the second direction on the one page image of the plurality of page images.

11. A computer-readable non-transitory recording medium with a display input control program recorded thereon, the display input control program allowing a computer to function as:
a gesture acceptance section configured to accept a user's gesture on a touch panel disposed in front of a display section configured to display a plurality of candidate images representing candidate pieces of data for image formation on an image forming apparatus;
a display control section configured to control a display operation of the display section according to the user's gesture accepted by the gesture acceptance section;
a job generating section configured to generate an image formation job for the image forming apparatus according to the user's gesture accepted by the gesture acceptance section; and
a communication control section configured to control a communication operation of a communication section capable of data transfer to and from the image forming apparatus,
the display input control program further allowing the computer to function so that:
when the gesture acceptance section accepts a slide gesture in a predetermined first direction on one of the plurality of candidate images, the job generating section generates the image formation job to allow the image forming apparatus to perform image formation based on the candidate piece of data for image formation represented by the one candidate image;
the communication control section allows the communication section to send the image formation job generated by the job generating section to the image forming apparatus;
when the gesture acceptance section accepts the slide gesture in the first direction on the one candidate image, the display control section allows the display section: to display, at an end of a display area of the display section in the first direction, the one candidate image as a pending image indicating a piece of data pending on the image forming apparatus; and to continue the state of displaying the one candidate image at an end of a display area in the first direction until the communication section receives from the image forming apparatus a report indicating a completion of the image formation job; and when the communication section the receives a report indicating a completion of the image formation job from the image forming apparatus, the display control section allows the display section to release the state of displaying and to eliminate the pending image displayed at the end.

* * * * *